United States Patent Office 2,852,578
Patented Sept. 16, 1958

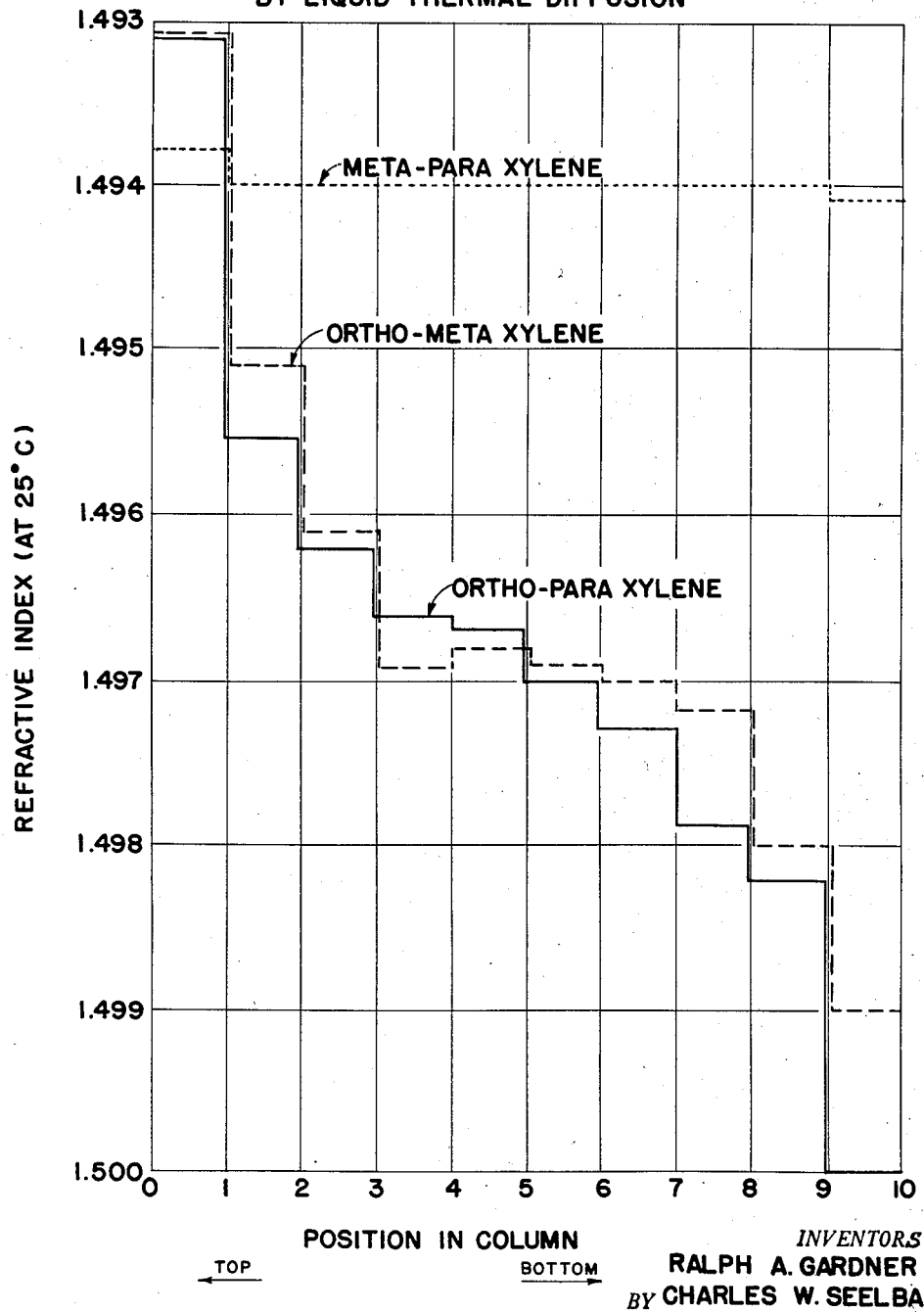

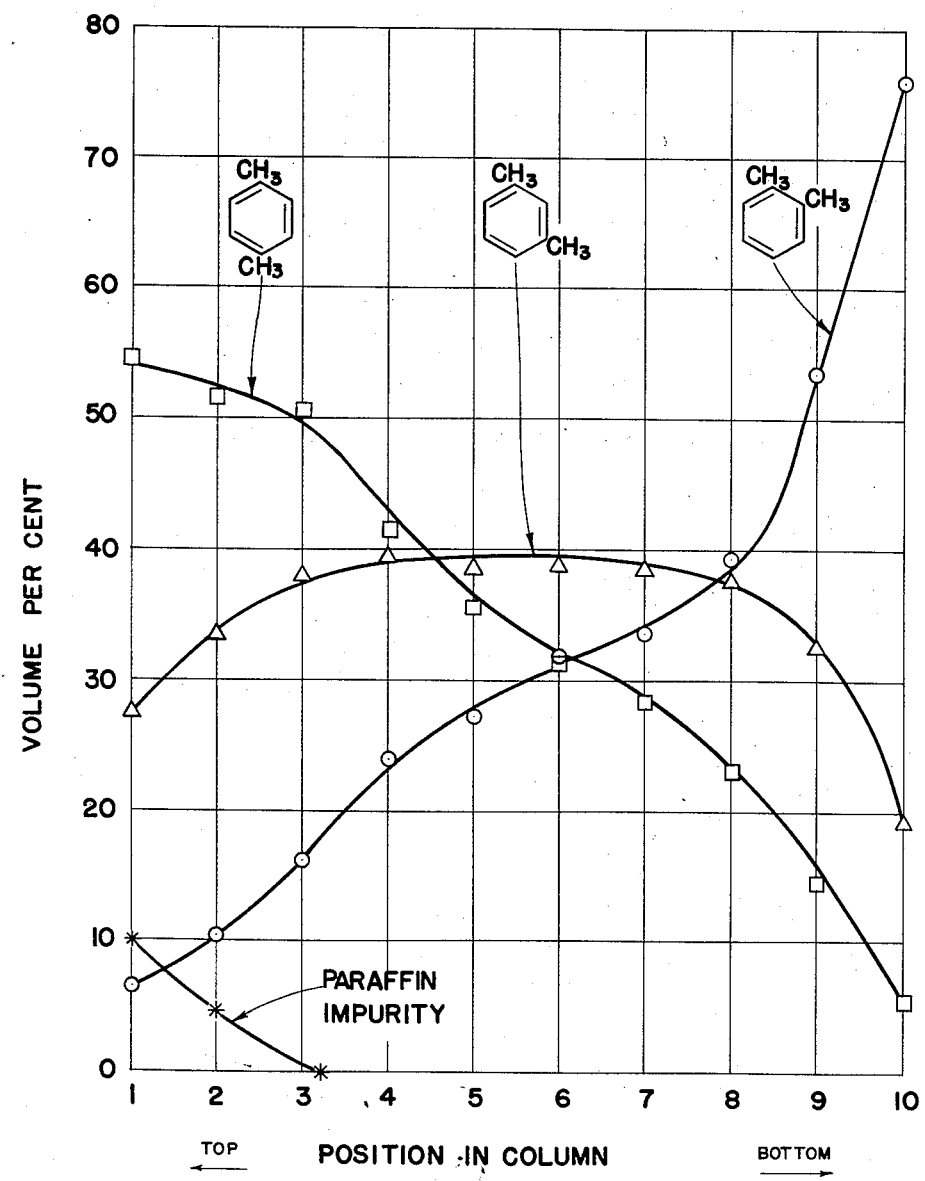

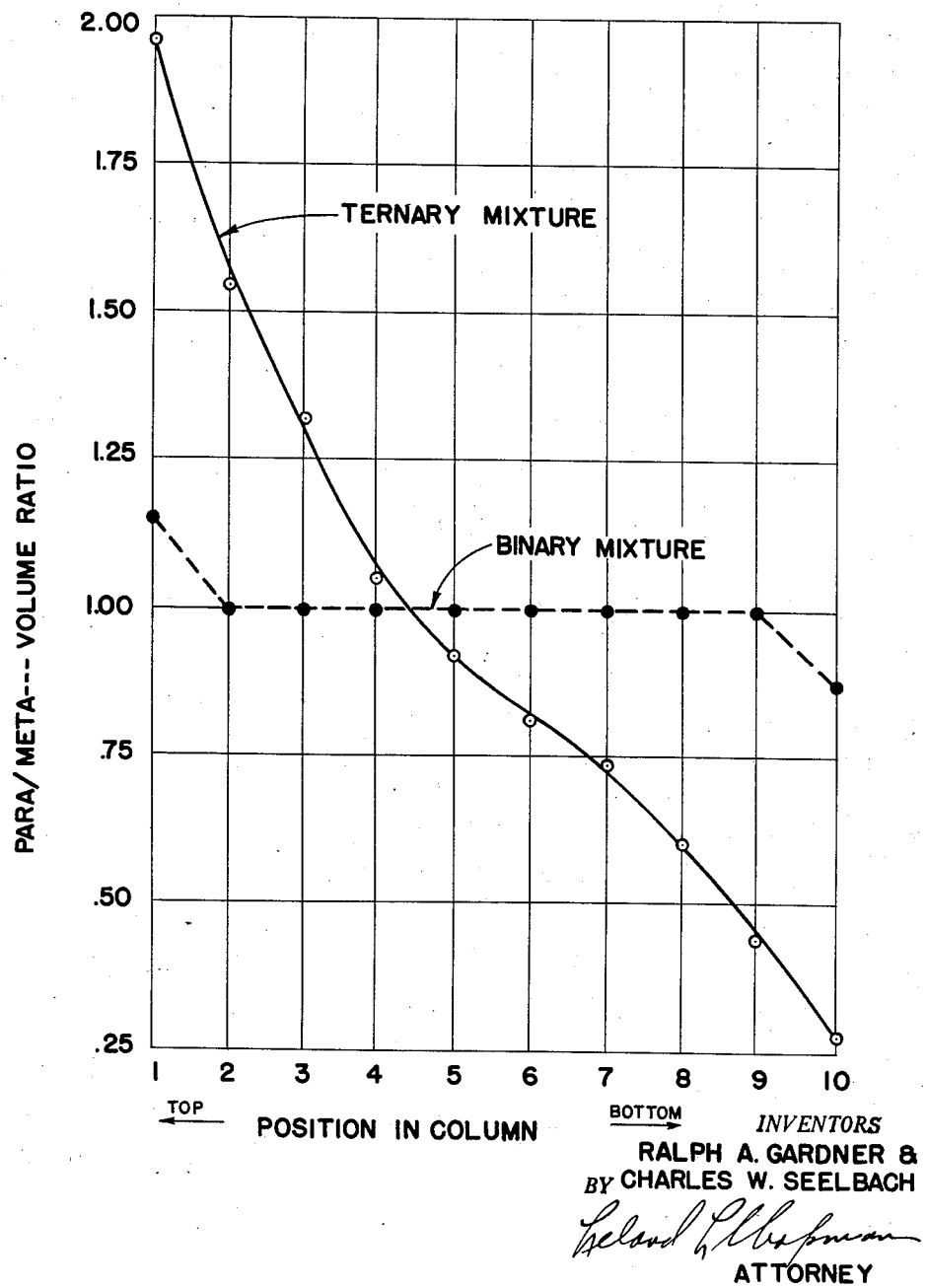

2,852,578

SEPARATION OF XYLENE ISOMERS BY LIQUID THERMAL DIFFUSION

Ralph A. Gardner, Cleveland, Ohio, and Charles W. Seelbach, West Lafayette, Ind., assignors to The Standard Oil Company, Cleveland, Ohio, a corporation of Ohio Application April 12, 1954, Serial No. 422,424

6 Claims. (Cl. 260—674)

This invention relates to a process for the separation of xylene isomers by liquid thermal diffusion and more particularly to the separation of mixtures of meta xylene and para xylene in the presence of ortho xylene by liquid thermal diffusion.

There is a growing demand for the pure isomers of xylene. Para xylene is a row material used in the production of terephthalic acid which, in turn, is used in the production of a well-known synthetic fiber. Efforts are being made to use o-xylene in the production of phthalic anhydride and to use m-xylene in the production of meta phthalic acid.

Unfortunately the methods of producing crude xylene in commercial quantities yield mixtures of its isomers. For example, the reforming of a 155–406° F. cut from a Mid-Continent crude oil over a chromia-alumina bead catalyst may yield a normally liquid product containing 6.6% xylene which is composed of 24% o-xylene, 21% p-xylene, and 55% m-xylene.

It is not too difficult to separate o-xylene from this xylene mixture because of the 9.5° F. spread between the boiling point of o-xylene and the nearest of the other two isomers. The big problem is to separate the meta and para isomers whose respective boiling points differ by only 1.4° F. This spread is too small to justify commercially their further separation by fractional distillation. Fractional crystallization appears to be a logical choice because their melting points differ by 110° F. However, an eutectic mixture is formed at about −63° F. when the concentration of p-xylene is about 13% by weight. Thus, when using fractional crystallization, a portion of p-xylene cannot be recovered. This loss can be reduced by increasing the concentration of p-xylene in the feed.

It has been known that the binary mixture of meta and para xylene is not sufficiently separable by liquid thermal diffusion to be practical. However, we have now discovered that these isomers are readily separable by liquid thermal diffusion when in the presence of ortho xylene. The ternary system of xylene isomers may contain as impurities other hydrocarbons without affecting the invention.

The relative proportion or ratio of p-xylene to m-xylene may vary widely, but for the best separations the ratio should fall on a volume basis in the range of 0.3 to 3.0. It is also possible to improve the degree of separation of the para and meta isomers by the presence of any amount of ortho xylene. However, for best separations the concentration of ortho xylene should range from 10 to 90% based on the total volumn of liquid to be treated, and preferably from 20 to 50%.

Neither the type of liquid thermal diffusion apparatus nor the flow pattern used therein are critical to this invention. The continuous flow apparatus disclosed in U. S. Patent No. 2,541,069 or the static columns of copending U. S. application S. N. 278,848 filed March 2, 1952, now Patent No. 2,742,154, may be used.

The same static type apparatus was used under identical conditions in obtaining all the data presented below. It is similar to that shown in Figure 1 of copending U. S. application S. N. 278,848. Its annular slit, formed by two concentric tubes, has an effective height of five feet, a width of 0.0115", and a volumetric capacity of 22.2 cc. Ten withdrawal ports are spaced six inches apart, beginning at the bottom. The slit walls were maintained at 115° and 70° F., respectively. At the end of a given period of time, ten liquid fractions were removed by first opening the top withdrawal port and draining the column to that level, and then successively following the same procedure for each withdrawal port in descending order of height until ten fractions were obtained.

The above static apparatus is extremely useful for separating small amounts of materials by thermal diffusion and to assay the potentialities of the process in separating components of any particular material. If a material separates in a static column, it can also be separated continuously in a thermal diffusion apparatus, and this fact is the reason why the type of thermal diffusion apparatus is not critical. The rate and degree of separation in all types of such apparatuses are influenced by many factors which are likewise not critical to this invention.

It is well known that the composition of any liquid is related to its refractive index. A change in composition can be measured and expressed in terms of a change in refractive index. Therefore, except where quantitative results are required, compositions were measured and are so reported in the examples in terms of refractive index because of the speed and ease of making such measurements.

Our invention will be better understood from the following examples and drawings in which Figure 1 is a plot in different positions of a thermal diffusion column of refractive index or composition of binary xylene isomer systems after 48 hours in a liquid thermal diffusion column;

Figure 2 is a plot in different positions of a thermal diffusion column of xylene isomer concentrations in a ternary xylene isomer system after 196 hours in the column; and Figure 3 is a graph of para to meta xylene isomer ratios based on the data shown in Figures 1 and 2.

EXAMPLES 1–3

The three possible binary xylene mixtures, ortho-para, ortho-meta, and meta-para were prepared from isomers currently sold as chemically "pure." The comparison in Table I of their actual refractive indices at 25° C. with literature values indicates the commercially "pure" isomers had a slight amount of impurities.

Table A

|  | Refractive Index—$n_D^{25}$ | |
|---|---|---|
|  | Isomers Used | Literature Values |
| Ortho | 1.5000 | 1.5029 |
| Meta | 1.4948 | 1.4946 |
| Para | 1.4925 | 1.4933 |

Each binary mixture comprising equal parts by volume of two different isomers was charged to the column. At the end of 48 hours, ten liquid fractions were withdrawn and their refractive indices measured. Results are tabulated in Table I.

Table I

| Example No. | 1 ortho-para | 2 ortho-meta | 3 meta-para |
|---|---|---|---|
| Fraction | | | |
| Feed (50-50 volume percent) | 1.4960 | 1.4974 | 1.4941 |
| 1 (Top 10%) | 1.4931 | 1.4931 | 1.4938 |
| 2 | 1.4956 | 1.4951 | 1.4940 |
| 3 | 1.4962 | 1.4961 | 1.4940 |
| 4 | 1.4966 | 1.4969 | 1.4940 |
| 5 | 1.4967 | 1.4968 | 1.4940 |
| 6 | 1.4970 | 1.4969 | 1.4940 |
| 7 | 1.4973 | 1.4970 | 1.4940 |
| 8 | 1.4979 | 1.4972 | 1.4940 |
| 9 | 1.4982 | 1.4980 | 1.4940 |
| 10 (Bottom 10%) | 1.5000 | 1.4990 | 1.4941 |

These results, plotted in Figure 1, show that the ortho-para and ortho-meta pairs are separable by liquid thermal diffusion, but that the meta-para mixture is not separable to any practical extent. For example, expressing percentage separation as the value obtained by dividing the refractive index difference between the top and bottom fractions by the same difference between the chemically "pure" isomers used in blending the binary mixtures, we find that the ortho-para mixture underwent a $$\left(\frac{1.5000 - 1.4931}{1.5000 - 1.4925}\right) \times 100$$

or 92% separation. The separation value for the ortho-meta mixture is 113%. Separations in excess of 100% are explained by the presence of impurities, as can be seen by the fact that the refractive index of the top fraction of the ortho-meta mixture is (1.4946-1.4931) or 0.0015 numbers below that theoretically possible. The separation value for the meta-para mixture is only 13%—a value so low, aside from any errors due to impurities, as to indicate that these cannot be separated by thermal diffusion on an economic basis.

Actual compositions of the top and bottom fractions in Examples 1-3 were determined by infra red analyses. Results are set forth in Table B below.

Table B

| Fraction | Ex. 1 (o-p) | Ex. 2 (o-m) | Ex. 3 (m-p) |
|---|---|---|---|
| | Volume Percent | | |
| 1 (Top 10%): | | | |
| ortho | 30.4 | 35.0 | 0.7 |
| meta | 2.1 | 56.1 | 45.1 |
| para | 56.8 | 2.1 | 51.9 |
| Total | [1] 89.3 | [1] 93.2 | 97.7 |
| 10 (Bottom 10%): | | | |
| ortho | [2] 64.6 | [2] 60.8 | 1.1 |
| meta | 1.8 | 37.9 | 52.9 |
| para | 33.6 | 1.3 | 45.6 |
| Total | 100.0 | 100.0 | 99.6 |

[1] Low because of impurity.
[2] Determined by difference.

EXAMPLES 4 AND 5

Ternary mixtures comprising equal volumes of each of the three chemically "pure" isomers were processed in the same apparatus and under the same conditions as in Examples 1-3. Fractions were withdrawn after 48 hours in the first instance, and after 196 hours in the second. Results are shown in Table C below.

Table C

| Fraction | Example 4 (48 hrs.) | Example 5 (196 hrs.) |
|---|---|---|
| Feed | 1.4955 | 1.4960 |
| 1 (top 10 percent) | 1.4850 | 1.4890 |
| 2 | 1.4911 | 1.4930 |
| 3 | 1.4939 | 1.4950 |
| 4 | 1.4949 | 1.4959 |
| 5 | 1.4955 | 1.4961 |
| 6 | 1.4960 | 1.4968 |
| 7 | 1.4967 | 1.4970 |
| 8 | 1.4970 | 1.4972 |
| 9 | 1.4982 | 1.4980 |
| 10 (bottom 10 percent) | 1.5000 | 1.4983 |

These figures in Table C are significant only in that they show something has been separated. To determine what has been separated, infra red analyses of the ten fractions obtained in Example 5 were made and the results are set forth in Table II and plotted in Figure 2.

Table II

| Fraction | Volume Percent | | | |
|---|---|---|---|---|
| | Ortho | Meta | Para | Total |
| 1 (top 10%) | 6.3 | 27.7 | 54.5 | [1] 88.5 |
| 2 | 10.2 | 33.4 | 51.4 | [1] 95.0 |
| 3 | 16.0 | 38.0 | 50.3 | 104.3 |
| 4 | 23.8 | 39.2 | 41.2 | 104.2 |
| 5 | 27.2 | 38.4 | 35.4 | 101.0 |
| 6 | 31.9 | 38.9 | 31.6 | 102.4 |
| 7 | 33.4 | 38.3 | 28.3 | 100.0 |
| 8 | 39.3 | 37.6 | 22.7 | 99.6 |
| 9 | [2] 53.2 | 32.5 | 14.3 | 100.0 |
| 10 | [2] 75.7 | 19.2 | 5.1 | 100.0 |

[1] Low because of impurity.
[2] Determined by difference.

Table II shows that the upper part of the column has become enriched in para xylene and the bottom of meta xylene.

The unexpected separation of the meta and para isomers of xylene in the presence of ortho xylene by liquid thermal diffusion is shown more effectively by comparing the volume ratios of para to meta in each fraction of Examples 3 and 5. These ratios are set forth in Table III and plotted in Figure 3.

Table III

| Fraction | Volume ratio: Para/Meta | |
|---|---|---|
| | Example 3 Binary Mixture | Example 5 Ternary Mixture |
| 1 | 1.15 | 1.96 |
| 2 | 1.0 | 1.54 |
| 3 | 1.0 | 1.32 |
| 4 | 1.0 | 1.05 |
| 5 | 1.0 | 0.92 |
| 6 | 1.0 | 0.81 |
| 7 | 1.0 | 0.74 |
| 8 | 1.0 | 0.60 |
| 9 | 1.0 | 0.44 |
| 10 | 0.87 | 0.27 |

By averaging the ratios for the top four fractions, it is noted that the process of this invention (Example 5) has increased the concentration of para xylene by a factor of 1.47 as compared to 1.04 without adding the third component.

Whereas the process of this invention has not completely separated the meta and para isomers, the concentration of para xylene from a factor of 1 up to 1.5, for example, will simplify further concentration of the enriched fraction by other processes such as fractional distillation, fractional crystallization, and solvent extraction. The invention, therefore, includes the treatment of a crude xylene mixture by liquid thermal diffusion

We claim:

1. A process for separating a solution of para xylene and meta xylene in the liquid phase which comprises subjecting said solution to thermal diffusion in the presence of 10 to 90% of ortho xylene based on the volume of the solution, whereby at least one fraction is enriched in para xylene and at least a second fraction is enriched in meta xylene.

2. The process of claim 1 in which the top fraction in a vertical liquid thermal diffusion process is enriched in para xylene.

3. The process of claim 1 in which the para xylene enriched fraction is subjected to a process of fractional crystallization.

4. The process of claim 1 in which the para xylene enriched fraction is further subjected to a process of fractional distillation, whereby the ortho xylene concentration of the overhead fraction is reduced.

5. The process of claim 4 in which the overhead fraction is subjected to a process of fractional crystallization.

6. A process for separating para xylene from a mixture thereof with meta xylene in a volume ratio of 0.3 to 3.0, which comprises subjecting said mixture in the presence of 20 to 50 volume percent ortho xylene based on the total volume of the solution, in the liquid phase, to thermal diffusion to separate the mixture into two fractions, one of which is enriched in meta xylene and the other of which is enriched in para xylene.

References Cited in the file of this patent

UNITED STATES PATENTS

| | | |
|---|---|---|
| 2,511,711 | Hetzner et al. | June 13, 1950 |
| 2,541,069 | Jones et al. | Feb. 13, 1951 |
| 2,541,071 | Jones et al. | Feb. 13, 1951 |

OTHER REFERENCES

Jones et al.: Ind. & Eng. Chem., vol. 45, pp. 2689–2696 (December 1953).